INVENTOR
Sven Alfred JOHANSSON
By

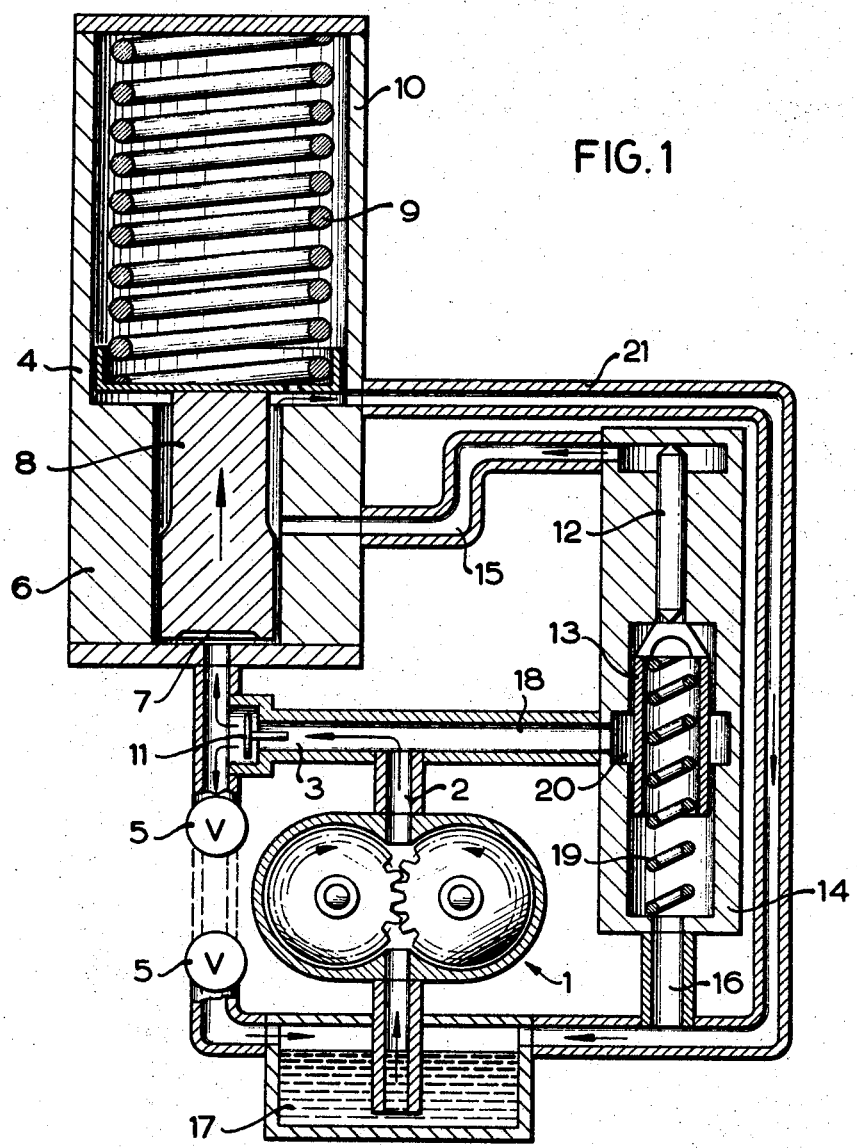

*Jacobs & Jacobs* his ATTORNEY

INVENTOR
Sven Alfred JOHANSSON
By his ATTORNEY

United States Patent Office 3,448,690
Patented June 10, 1969

3,448,690
HYDRAULIC OR PNEUMATIC PRESSURE
CONTROL SYSTEMS
Sven Alfred Johansson, Finjagaton 29B,
Hassleholm, Sweden
Filed Sept. 19, 1967, Ser. No. 683,043
Int. Cl. F04b 49/08, 11/00
U.S. Cl. 103—41                                                9 Claims

ABSTRACT OF THE DISCLOSURE

An hydraulic or pneumatic pressure control system comprising a shut-off valve having a slide housing connected to the pressure and suction sides of a pump, an accumulator for accumulating pump pressure energy which includes a chamber and a piston movably disposed therein, a piston for moving the slide and a conduit between the accumulator chamber and a chamber at the head of the piston which moves the slide.

---

This invention relates to hydraulic or pneumatic pressure control systems of the kind disclosed in the specification of my prior British Patent No. 824,017 and comprising a shut-off valve, a pump and an accumulator for accumulating pressure energy, the object being to provide improvements therein.

According to this invention, an hydraulic or pneumatic pressure control system comprising a shut-off valve, a pump and an accumulator for accumulating pressure energy, said accumulator including an accumulator chamber and a piston arranged therein and adapted for its end surface at the pressure side of the accumulator to be acted upon by the pressure medium generated by the pump and for its other end surface at the suction side of the accumulator to be acted upon by a counteracting force, the shut-off valve comprising a slide-housing connected to both the pressure side and the suction side of the pump, a slide movable in the slide-housing to one end position therein so that, when the accumulator piston is in its end position corresponding to the empty state of the accumulator, the slide will prevent flow of pressure medium through the slide housing from the pressure side of the pump to the suction side of the pump so that pressure medium generated by the pump will flow to the pressure side of the accumulator, the slide also being movable in the slide-housing to its opposite end position when the accumulator piston is in its other end position in the accumulator chamber corresponding to the filled state of the accumulator so as to permit flow of pressure medium through the slide-housing from the pressure side of the pump to the suction side of the pump and thereby unload the pump, said shut-off slide being moved in one direction by a control piston movable in the slide-housing and in the opposite direction by a spring, the accumulator piston, when it is in its said end position corresponding to the filled state of the accumulator, opening a first conduit between the accumulator chamber and the chamber at the head of the control piston, which first conduit is so connected to the accumulator chamber that pressure medium can flow from the pressure side of the accumulator piston to the chamber at the head of the control piston at or before the accumulator piston reaches the said filled state end position, the pressure medium moving the control piston and the shut-off slide to the said opposite end position of the slide and retaining them in that position until the accumulator piston returns to its empty state end position when it again opens the said first conduit to enable pressure medium to flow from the chamber at the head of the control piston to the suction side of the accumulator piston and on to the suction side of the pump at or before the accumulator piston reaches the said empty state end position, enabling the spring acting upon the shut-off slide to move the shut-off slide and the control piston to the position wherein the slide prevents flow of pressure medium through the slide-housing between the pressure and suction sides of the pump, is characterised in that a second conduit is provided between the pressure side and the suction side of the pump, and a valve is provided to connect the accumulator chamber to the pressure side of the pump and/or, by way of said second conduit, to the suction side of the pump or, by way of said second conduit, to connect the pressure and suction sides of the pump to each other. Alternatively, an hydraulic or pneumatic pressure control system comprising a shut-off valve, a pump and an accumulator for accumulating pressure energy, said accumulator including an accumulator chamber and a piston arranged therein and adapted for its end surface at the presusre side of the accumulator to be acted upon by the pressure medium generated by the pump and for its other end surface at the suction side of the accumulator to be acted upon by a counteracting force, the shut-off valve comprising a slide-housing connected to both the pressure side and the suction side of the pump, a slide movable in the slide-housing to one end position therein so that, when the accumulator piston is in its end position corresponding to the empty state of the accumulator, the slide will prevent flow of pressure medium through the slide-housing from the pressure side of the pump to the suction side of the pump so that pressure medium generated by the pump will flow to the pressure side of the accumulator, the slide also being movable in the slide-housing to its opposite end position when the accumulator piston is in its other end position in the accumulator chamber corresponding to the filled state of the accumulator so as to permit flow of pressure medium through the slide-housing from the pressure side of the pump to the suction side of the pump and thereby unload the pump, said shut-off slide being moved in one direction by a control piston movable in the slide-housing and in the opposite direction by a spring, the accumulator piston, when it is in its said end position corresponding to the filled state of the accumulator, opening a first conduit providing a connection between the accumulator chamber and the chamber at the head of the control piston, which first conduit is so connected to the accumulator chamber that pressure medium can flow from the pressure side of the accumulator piston to the chamber at the head of the control piston at or before the accumulator piston reaches the said filled state end position, the pressure medium moving the control piston and the shut-off slide to the said opposite end position of the slide and retaining them in that position until the accumulator piston returns to its empty state end position when it again opens the said first conduit to enable pressure medium to flow from the chamber at the head of the control piston to the suction side of the accumulator piston and on to the suction side of the pump at or before the accumulator piston reaches the said empty state end position, enabling the spring acting upon the shut-off slide to move the shut-off slide and the control piston to the position wherein the slide prevents flow of pressure medium through the slide-housing between the pressure and the suction sides of the pump, is characterised in that a valve is provided in said first conduit so as to open or close the connection between the accumulator chamber and the chamber at the head of the control piston.

The invention is illustrated in the accompanying drawings, wherein:

FIG. 1 shows a known pressure control system as disclosed in specification No. 842,017;

Figure 1A:
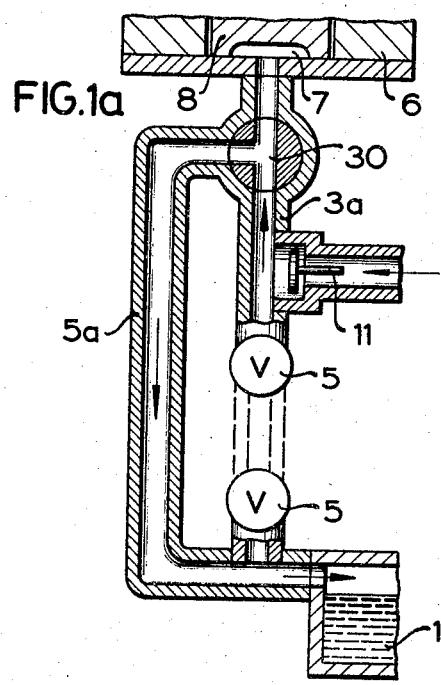
FIGS. 1A, 1B, 1C and 1D show a part of the apparatus of FIG. 1, modified in accordance with one form of the present invention and showing a valve in different positions.
Figure 1B:
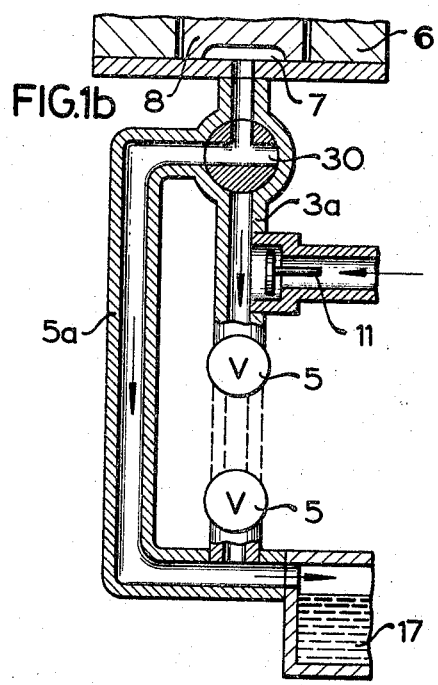
Figure 1C:
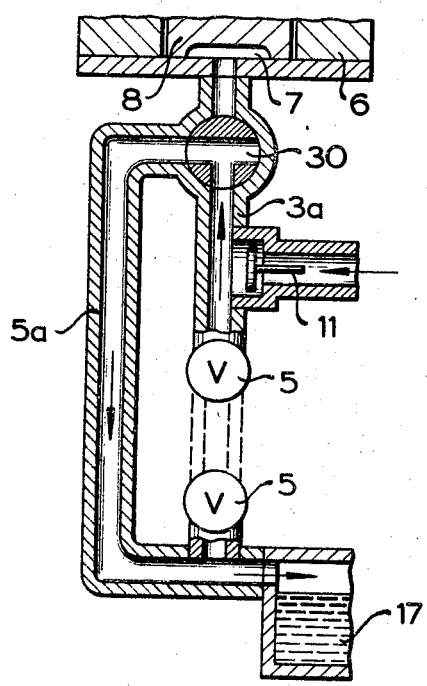
Figure 1D:
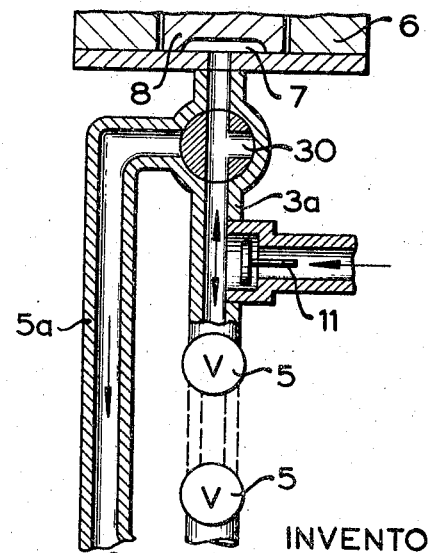

In FIG. 1 the numeral designates a pump which communicates through a conduit 2 and a conduit 3 with an accumulator 4 and consumer apparatus 5. A non-return valve 11 in the conduit 3 prevents return-flow of the pressure medium, for example, oil, to the pump 1. The accumulator 4 comprises an accumulator housing 6, in the chamber 7 of which a piston 8 is movable. The one end of the piston 8 is actuated by the pressure oil in the accumulator chamber, while the other end is loaded by a spring 9 in a housing 10. The tension of the spring 9 may be adjusted by screw-means not shown. The chamber at the spring-side of the piston 8 communicates through a conduit 21 with the suction side of the pump or the oil sump 17. Any oil leaking past the piston 8 will thus be led through this conduit 21 to the sump 17.

In the conduit system there is provided a relief-valve, which consists essentially of two members, namely a control piston 12 and a shut-off slide 13, both of which move with slight friction in a slide housing 14. These two members may also be made in a single piece. That part of the slide housing 14, in which the control piston 12 moves is by means of a conduit 15 connected to the accumulator chamber 7 at the point where the pressure side or end of the piston 8 reaches its highest position in the chamber 7. The other part of the slide housing 14, which contains the shut-off slide 13, communicates through a conduit 16 with the suction side of the pump and through a conduit 18 and the conduit 2 with the pressure side of the pump. The conduit 18 is so connected to the slide housing that the shut-off slide 13 closes the connection between the pressure and suction sides of the pump, when it is in its one end position. The spring 19 is adapted to retain the shut-off slide in this position. To avoid unilateral pressure loading on the shut-off slide the connection of the conduit 18 to the slide housing 14 is formed as an annular channel 20. To avoid unilateral pressure loading on the piston 8 from the conduit 15 an annular groove may be provided in the accumulator housing 6, where said conduit opens, whereby the pressure loading on the piston 8 is balanced.

The relief valve works in the following manner. When starting, the whole system is without pressure and the piston 8 is held by the spring 9 in its end position, corresponding to the empty state simultaneously as the shut-off slide 13 is in its closing end position, FIG. 1. Oil from the pump 1 must, when starting, flow through the conduits 2 and 3 via the non-return valve 11 to the accumulator chamber 7 and the consumer apparatus 5 in the pressure system. When all available space is filled with oil, the piston 8 starts moving towards its other end position, corresponding to the filled state, as the pressure rises. When the piston 8 has arrived in this end position, it opens a connection, the conduit 15, between the accumulator chamber 7 and the chamber in front of the control piston 12. The control piston 12 and the shut-off slide 13 are thereby moved by the pressure oil towards its other end position during simultaneous increase in the tension of the spring 19. Thereby a connection is established between the conduits 18 and 16 so that oil from the pump 1 can pass with slight resistance this way through a central bore in the shut-off slide 13 to the suction side 17 of the pump. Thus the pump has been unloaded and idles. Simultaneously the non-return valve 11 closes and prevents return-flow to the pump 1 from the accumulator chamber 7. If oil is consumed, the piston 8 returns and forces the oil before itself and at the same time it closes the conduit 15. The amount of oil which thereby has been confined in the conduit 15 and the chamber in front of the control piston 12, maintains the shut-off slide in an unchanged position, until the piston 8 arrives in the end position, corresponding to the empty state. At this time a connection between the conduit 15 and the suction side 17 of the pump is established by the piston 8 through the conduit 21 at which the shut-off slide 13 is moved to the closing position by the action of the spring 19. The pump 1 now again starts to feed oil to the accumulator chamber 7 through the conduits 2 and 3 and the process is repeated.

The present invention is directed to improving the operation of the apparatus disclosed in specification No. 842,017 and illustrated in FIG. 1.

In order to economise in the use of the plant and of the pressure medium, and in order to avoid unnecessary consumption of energy and leakage, one ought not to use higher pressure in the medium than what is needed in each individual case, both when idling and when on full load.

Also, in order to compensate for varying load on the pressure side of the system, and thereby avoid pressure shocks, which can cause large loads on different parts of the plant, such as on the pump and packings, it is desirable to have an accumulator which is provided with a gas- or spring-cushion, which compensates the small compression of a liquid. That means that the accumulator reduces the shock effect at rapid load variation in the pressure system and has a function similar to an elastic coupling in a transmission system.

In order to realise the foregoing desires the system ought to be provided with an accumulator which always is connected to the pressure side of the system, and, if possible, with an adjustable relief-pressure for the pressure system operating continuously from idling to full load. The pump in the pressure system according to the present invention is moving continuously as in the specification No. 842,017, the pump holding the pressure system charged all the time with pressure medium of a pressure which depends on the counter pressure from the accumulator. The apparatus shown in FIG. 1 has only a single conduit 15 between the accumulator chamber 7 and the chamber at the head of the control piston 12. That means that the accumulator unloads the pump at the same pressure both when idling and on full load, the said pressure being the adjusted pressure of the gas- or spring-cushion of the accumulator. On rapid opening of the relief-valve 13, this pressure is the maximum pressure exerted on the pump from the pressure side of the system. But if the pressure should continue to rise above this relief- pressure on load-variation on the pressure side of the system, the pump is protected against this overpressure by the non-return valve 11. If the relief-valve, on the other hand, should not open and unload the pump sufficiently rapidly at such pressure-variation on the pressure side of the system, it is an advantage to have the accumulator connected to the pressure side as an overload protection.

However, it is desirable to unload the pump at a smaller pressure when idling and at a higher pressure when on full load. This could be attained by altering the previously adjusted initial counter-presusre of the accumulator rapidly and continuously. In specification No. 842,017 it is pointed out that the gas cushion or the spring in a spring cushion could have a desired initial pressure. In order to obtain an alteration in the counter-pressure in the accumulator rapidly and continuously one can use another piston which actuates and compresses the gas- or spring-cushion from the opposed side to desired initial pressure. This second piston can also be controlled by pressure medium from the pressure side of the pump. With such a modification, a single conduit 15 can be retained between the pressure chamber of the system and the chamber at the head of the control piston 12, and it should be possible to get an unloading of the pump at a pressure suitable to the load conditions.

However, it is also possible to use a modified construction having only one accumulator piston as in FIG. 1. Such a modification is shown in FIGS. 1A to 1D, wherein a valve 30 is disposed in the conduit 3a from the pressure side of the pump to the accumulator chamber 7, and a conduit 5a is provided from the valve 30 to the suction side of the pump. When it is desired to attain a continuously adjustable relief-pressure, the pressure in the medium on the pressure side of the system should adjust itself automatically according to the load, provided there is no possibility of direct overflow or unloading from the pressure side to the suction side of the system. For that reason it ought to be possible to continuously limit the relief-pressure to an idle pressure and to a maximum load pressure for the pump. In order to make this more clear, the following three pressure limits from the medium are defined:

The idle pressure, which is obtained on the pressure side of the system when the pump is unloaded by the relief-valve at idling.

Normal load pressure, which is obtained on the pressure side of the system when the pump is unloaded by the relief-valve at continuous operation. This is the highest pressure which the pump normally will work against at continuous operation.

Maximum load pressure, which is determined by the capacity of the system and at which direct overflow can take place from the pressure side to the suction side of the system by an ordinary safety valve.

Referring to FIG. 1, the previously adjusted initial pressure of the accumulator has such a value that the pump is automatically discharged by the relief-valve at a wanted disconnected entirely from the system by a valve 30 (FIGS. 1A to 1D) in the conduit 3a from the pump to the accumulator chamber 7. This valve 30 can be controlled manually or automatically. There is also a conduit 5a from the valve 30 to the suction side of the pump. The valve 30 will be able to connect the accumulator chamber 7, the pressure side of the pump and the suction side of the pump to each other as shown in FIG. 1A. The valve 30 will also be able to connect the accumulator chamber 7 with the suction side of the pump as shown in FIG. 1B when the shut-off slide 13 of the relief-valve is in its closing end position, when the pump immediately can feed pressure medium to the pressure side of the system and to the consumer apparatus 5. In this case the pressure of the system will adjust itself to the load at all times when there is no possibility of any overflow from the pressure side to the suction side of the system. But in this case the accumulator is not always connected to the pressure side of the system, and there is also no safety valve on the pressure side of the system for limiting of the pressure to maximum load pressure. The valve 30 will also be able to connect the pressure side of the pump to the suction side of the pump as shown in FIG. 1C, or to connect the accumulator chamber 7 to the pressure side of the pump as shown in FIG. 1D.

Figure 2A:
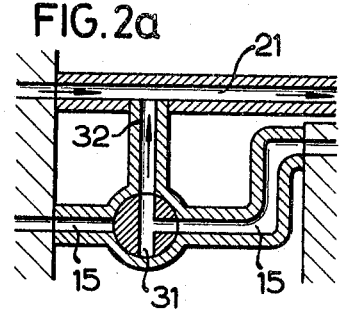
FIG. 2A shows a part of FIG. 2, with a valve in another position.
Figure 2:
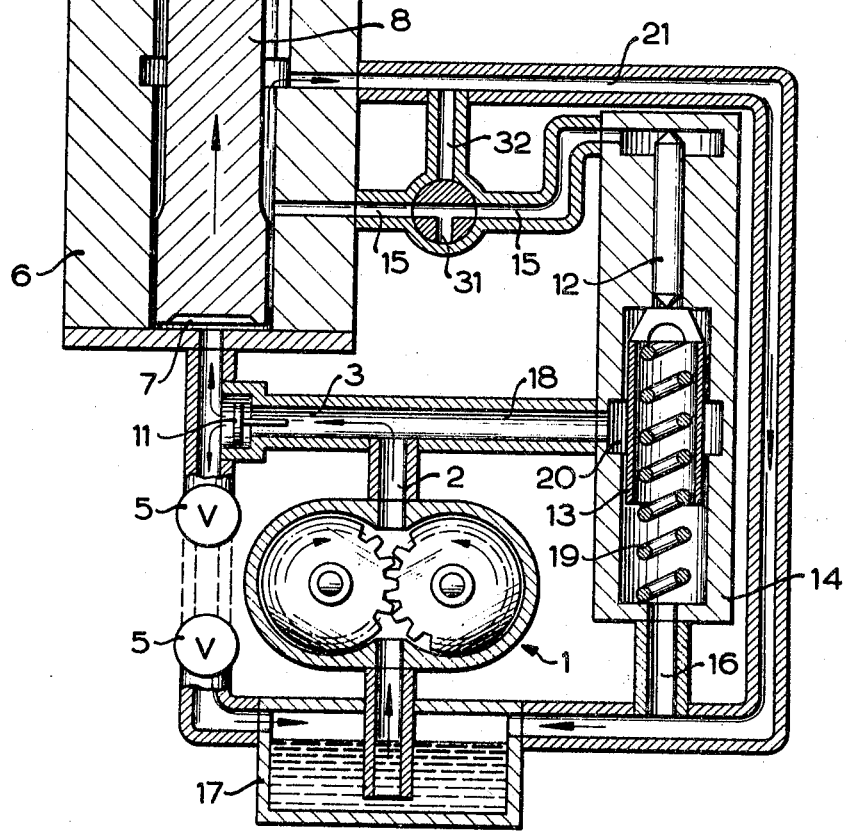
FIG. 2 shows the apparatus of FIG. 1 modified in accordance with another form of the present invention.

In FIG. 2, a valve 31 is disposed in the conduit 15 between the accumulator chamber 7 and the chamber at the head of the control piston 12. From the valve 31 a conduit 32 is connected to the conduit 21 and to the suction side of the system. The accumulator is thus always connected to the pressure side of the system. The conduit 15 will also serve for unloading of the pump at a desired idle pressure. When a higher pressure on the pressure side of the system is wanted at full load, the conduit 15 is shut off from the accumulator chamber 7 by the valve 31 as shown in FIG. 2A, whereupon the chamber at the head of the control piston 12 is connected with the suction side of the system by the conduits 15, 32 and 21, when the shut-off slide 13 is moved towards its closing end position, at which the pump immediately can feed pressure medium to the pressure side of the system. In this case the pressure of the system will adjust itself to the load at all times as long as there is no possibility of any overflow from the pressure side to the suction side of the system. In order to limit the pressure on the pressure side of the system to normal load pressure, which the pump normally will work against at continuous operation, the accumulator piston is arranged to function as a safety valve for direct overflow from the accumulator chamber of the system by way of the pressure side of the accumulator piston and the conduit 21 to the suction side of the pump at the above pressure. In this way the pump and remaining parts are protected against any pressure shocks from the load side.

Figure 3:
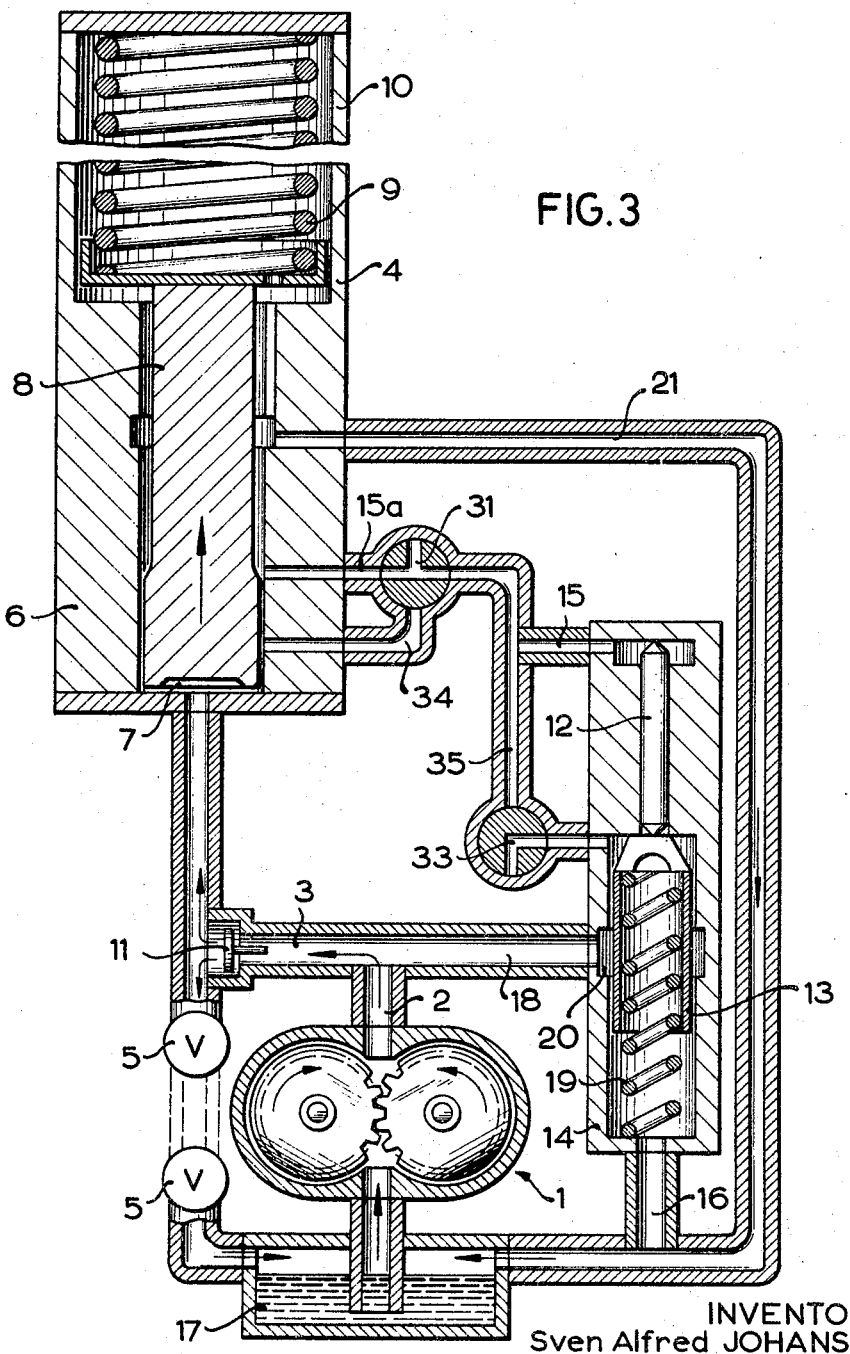
FIG. 3 shows the apparatus of FIG. 1 modified in accordance with another form of the present invention.

However, direct overflow from the pressure side to the suction side of the system by a conventional safety valve is accompanied with large losses. Those losses are avoided when the direct overflow is replaced by unloading of the pump by the relief-valve of the system, which is governed by the accumulator. In order to realise this also at normal load pressure, which the pump will work against at continuous operation, the apparatus can be modified in the manner shown in FIG. 3. In this case automatic unloading of the pump by the relief-valve of the system at both idle pressure and normal load pressure can be obtained, and at the same time the accumulator piston will function as a conventioal safety valve for direct overflow from the pressure side to the suction side of the system at maximum load pressure, which can arise at exceptional large loads and fluctuations of pressure on the pressure side of the system.

The conduit 15 between the accumulator chamber 7 and the chamber at the head of the control piston 12 will serve for unloading of the pump at idle and normal load pressure. For unloading the pump at normal load pressure a conduit 15 is connected to the accumulator chamber 7 and the valve 31. For unloading of the pump at idle pressure a conduit 34 is connected to the accumulator chamber 7 nearer to the head thereof than the conduit 15A, and the conduit 34 also is connected to the valve 31. In order to make it possible to work with higher pressure on the medium than normal load pressure at exceptionally large loads, without unloading of the pump by the relief-valve of the system up to maximum load pressure, both the conduit 15A and the conduit 34 from the accumulator chamber 7 can be shut off. At the same time the chamber at the head of the control piston 12 is connected with the suction side of the pump by a conduit 35 and a valve 33, when the shut-off slide 13 is moved towards its closing end position, at which the pump immediately can feed pressure medium to the pressure side of the system. In this case the pressure of the system will be adjusted with the load at all times up to maximum load pressure, the accumular piston functioning as a conventional safety valve for direct overflow from the accumular chamber 7 by way of the pressure side of the accumulator piston and the conduit 21 to the suction side of the pump. The different work positions of the valves 31 and 33 are shown in FIGS. 3A, 3B and 3C.

Figure 3A:
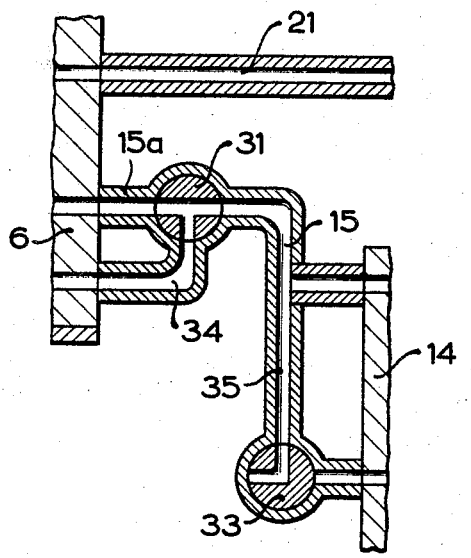
FIGS. 3A, 3B and 3C show parts of FIG. 3, with valves in other positions.

FIG. 3A corresponds to automatic unloading of the pump by the relief-valve at idle pressure. In this case the accumulator chamber 7 is connected with the chamber at the head of the control piston 12 through both the conduits 15A and 34, the valve 31 and the conduit 15, the medium flowing from 7 to 12 via conduit 15, the valve 31, and conduit 34, while fluid from 12 to 7 to the suction side of the system passes via conduit 15, valve 31 and conduit 15A, the piston being in an appropriate position in the chamber 7. At the same time the valve 33 is in a closing position in conduit 35.

Figure 3B:
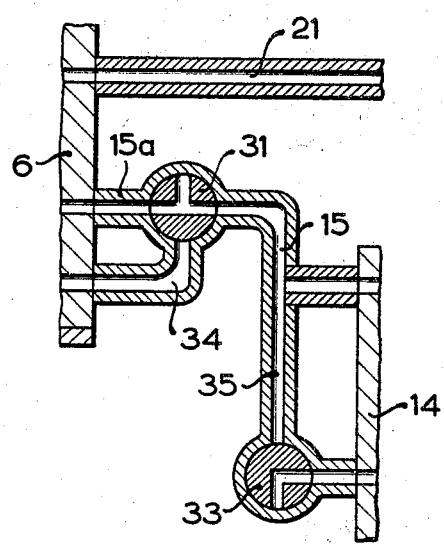

FIG. 3B corresponds to automatic unloading of the pump by the relief-valve of the system at normal load pressure. In this case the accumulator chamber 7 is connected with the chamber at the head of the control piston 12 through conduit 15A, the valve 31 and conduit 15, the fluid both to and from the chamber at the head of the control piston 12 flowing this way. The conduit 34, which is connected with the accumulator chamber 7, is at the same time shut off by the valve 31, and at the same time the valve 33 is in a shut-off position in the conduit 35.

Figure 3C:
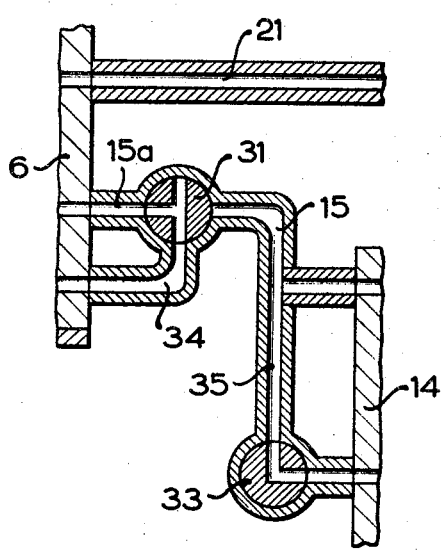

FIG. 3C corresponds to a working position, which makes it possible to work with pressure on the medium from minimum to maximum load pressure without automatic unloading of the pump by the relief-valve of the system. In this case the connection between the accumulator chamber 7 and the chamber at the head of the control piston 12 is entirely cut off by the valve 31. At the same time the valve 33 is in an open position in the conduit 35, whereupon the chamber at the head of the control piston 12 is connected with the suction side of the system via the conduit 35, the shut-off slide 13 being in its closing end position, and the pump immediately can feed pressure medium to the pressure side of the system. If it is desired to unload the pump by the relief-valve of the system at any moment or at a certain pressure on the medium of the pressure side, this can be realised by moving the valves 31 and 33 from the work positions shown in FIG. 3C to the work position shown in FIGS. 3B or 3A.

The valves 31 and 33 can be made and controlled in any suitable manner; they may be made as two separate valves, or as a single valve assembly with the valves 31 and 33 provided by different sections of the same assembly. The valve assembly can be made as a rotary element as shown, or as a slide. The operation of the valves can be controlled manually or automatically; this can be done in conjunction with the operation of the regulating valves at the consumer apparatus 5 and in such a way that the valves 31 and 33 are automatically positioned for unloading of the pump at idle pressure, when no medium is taken out of the system by the consumer apparatus 5, or for unloading of the pump at normal load pressure or higher pressure up to maximum load pressure, when medium is taken from the system by the consumer apparatus 5.

The arrangements described herein can be used with any of the different forms of apparatus disclosed in specification No. 842,017. For instance, large accumulator volumes can be connected directly with the pressure side of the pump, which accumulator volumes then act as the actual accumulator, while the accumulator shown, together with the relief-valve, serves mainly as means for controlling the function of the pump. An additional slide or some other valve arrangement can be connected outside the accumulator for the opening and closing of the conduits 15, 34 and 21, which in the arrangements herein described is done by the accumulator piston 8. For control of the additional slide- or valve-arrangement the movement of the accumulator piston 8 which indicates the pressure in the medium on the pressure side of the system, must be transmitted to the additional slide in some way, either directly or indirectly by some transmission means.

What I claim is:

1. An hydraulic or pneumatic pressure control system comprising a shut-off valve, a pump and an accumulator for accumulating pressure energy, said accumulator including an accumulator chamber and a piston arranged therein and adapted for its end surface at the pressure side of the accumulator to be acted upon by the pressure medium generated by the pump and for its other end surface at the suction side of the accumulator to be acted upon by a counteracting force, the shut-off valve comprising a slide-housing connected to both the pressure side and the suction side of the pump, a slide movable in the slide-housing to one end position therein so that, when the accumulator piston is in its end position corresponding to the empty state of the accumulator, the slide will prevent flow of pressure medium through the slide-housing from the pressure side of the pump to the suction side of the pump so that pressure medium generated by the pump will flow to the pressure side of the accumulator, the slide also being movable in the slide-housing to its opposite end position when the accumulator piston is in its other end position in the accumulator chamber corresponding to the filled state of the accumulator so as to permit flow of pressure medium through the slide-housing from the pressure side of the pump to the suction side of the pump and thereby unload the pump, said shut-off slide being moved in one direction by a control piston movable in the slide-housing and in the opposite direction by a spring, the accumulator piston, when it is in its said end position corresponding to the filled state of the accumulator, opening a first conduit between the accumulator chamber and the chamber at the head of the control piston, which first conduit is so connected to the accumulator chamber that pressure medium can flow from the pressure side of the accumulator piston to the chamber at the head of the control piston at or before the accumulator piston reaches the said filled state end position, the pressure medium moving the control piston and the shut-off slide to the said opposite end position of the slide and retaining them in that position until the accumulator piston returns to its empty state end position when it again opens the said first conduit to enable pressure medium to flow from the chamber at the head of the control piston to the suction side of the accumulator piston and on to the suction side of the pump at or before the accumulator piston reaches the said empty state end position, enabling the spring acting upon the shut-off slide to move the shut-off slide and the control piston to the position wherein the slide prevents flow of pressure medium through the slide-housing between the pressure and suction sides of the pump, characterised in that a second conduit is provided between the pressure side and the suction side of the pump, and a valve is provided to connect the accumulator chamber to the pressure side of the pump and/or, by way of said second conduit, to the suction side of the pump or, by way of said second conduit, to connect the pressure and suction sides of the pump to each other.

2. An hydraulic or pneumatic pressure control system comprising a shut-off valve, a pump and an accumulator for accumulating pressure energy, said accumulator including an accumulator chamber and a piston arranged therein and adapted for its end surface at the pressure side of the accumulator to be acted upon by the pressure medium generated by the pump and for its other end surface at the suction side of the accumulator to be acted upon by a counteracting force, the shut-off valve comprising a slide housing connected to both the pressure side and the suction side of the pump, a slide movable in the slide-housing to one end position therein so that, when the accumulator piston is in its end position corresponding to the empty state of the accumulator, the slide will prevent flow of pressure medium through the slide-housing from the pressure side of the pump to the suction side of the pump so that pressure medium generated by the pump will flow to the pressure side of the accumulator, the slide also being movable in the slide-housing to its opposite end position when the accumulator piston is in its other end position in the accumulator chamber corresponding to the filled state of the accumulator so as to permit flow of pressure medium through the slide-housing from the pressure side of the pump to the suction side of the pump and thereby unload the pump, said shut-off slide being moved in one direction by a control piston movable in the slide-housing and in the opposite direction by a spring, the accumulator piston, when it is in its said end position corresponding to the filled state of the accumulator, opening a first conduit providing a connection between the accumulator chamber and the chamber at the head of the control piston, which first conduit is so connected to the accumulator chamber that pressure medium can flow from the pressure side of the accumulator piston to the chamber at the head of the control piston at or before the accumulator piston reaches the said filled state end position, the pressure medium moving the control piston and the shut-off slide to the said opposite end position of the slide and retaining them in that position until the accumulator piston returns to its empty state end position when it again opens the said first conduit to enable pressure medium to flow from the chamber at the head of the control piston to the suction side of the accumulator piston and on to the suction side of the pump at or before the accumulator piston reaches the said empty state end position, enabling the spring acting upon the shut-off slide to move the shut-off slide and the control piston to the position wherein the slide prevents flow of pressure medium through the slide-housing between the pressure and suction sides of the pump, characterised in that a valve is provided in said first conduit so as to open or close the connection between the accumulator chamber and the chamber at the head of the control piston.

3. An hydraulic or pneumatic pressure control system according to claim 2, characterised in that a further valve is provided in a further conduit between the head of the slide of the shut-off valve and the first conduit so as to open or close said further conduit.

4. An hydraulic or pneumatic pressure control system according to claim 2, characterised in that a conduit is provided to connect the said valve in said first conduit to a conduit extending between the suction side of the accumulator and the suction side of the pump.

5. An hydraulic or pneumatic pressure control system according to claim 3, characterised in that two conduits connect the said valve in said first conduit to the accumulator chamber at different distances from the pressure end of the accumulator piston.

6. An hydraulic or pneumatic pressure control system according to claim 1 wherein said valves, other than the shut-off valve, are actuated manually.

7. An hydraulic or pneumatic pressure control system according to claim 1 wherein said valves are actuated automatically.

8. An hydraulic or pneumatic pressure control system according to claim 1 wherein said valves, other than the shut-off valve, are actuated in conjunction with control valves of a consumer device.

9. An hydraulic or pneumatic pressure control system according to claim 1 wherein the accumulator piston functions as a safety valve for direct overflow from the accumulator chamber to the suction side of the pump at maximum load pressure.

References Cited

UNITED STATES PATENTS

| | | | |
|---|---|---|---|
| 2,715,992 | 8/1955 | Wilson | 230—31 |
| 3,210,011 | 10/1965 | Barosko | 103—223 X |
| 3,122,099 | 2/1964 | Bessiere. | |
| 3,181,472 | 5/1965 | Sennet | 103—42 X |
| 3,322,134 | 5/1967 | Enemark | 103—42 X |
| 3,396,663 | 8/1968 | Bratten | 103—42 |

FOREIGN PATENTS

| | | |
|---|---|---|
| 425,500 | 3/1935 | Great Britain. |
| 852,715 | 10/1960 | Great Britain. |
| 944,422 | 12/1963 | Great Britain. |

DONLEY J. STOCKING, *Primary Examiner.*

WARREN J. KRAUSS, *Assistant Examiner.*

U.S. Cl. X.R.

103—223